Nov. 24, 1942.　　　　F. PORTER　　　　2,302,888
MANUFACTURE OF MALEIC ANHYDRIDE
Filed Aug. 6, 1940
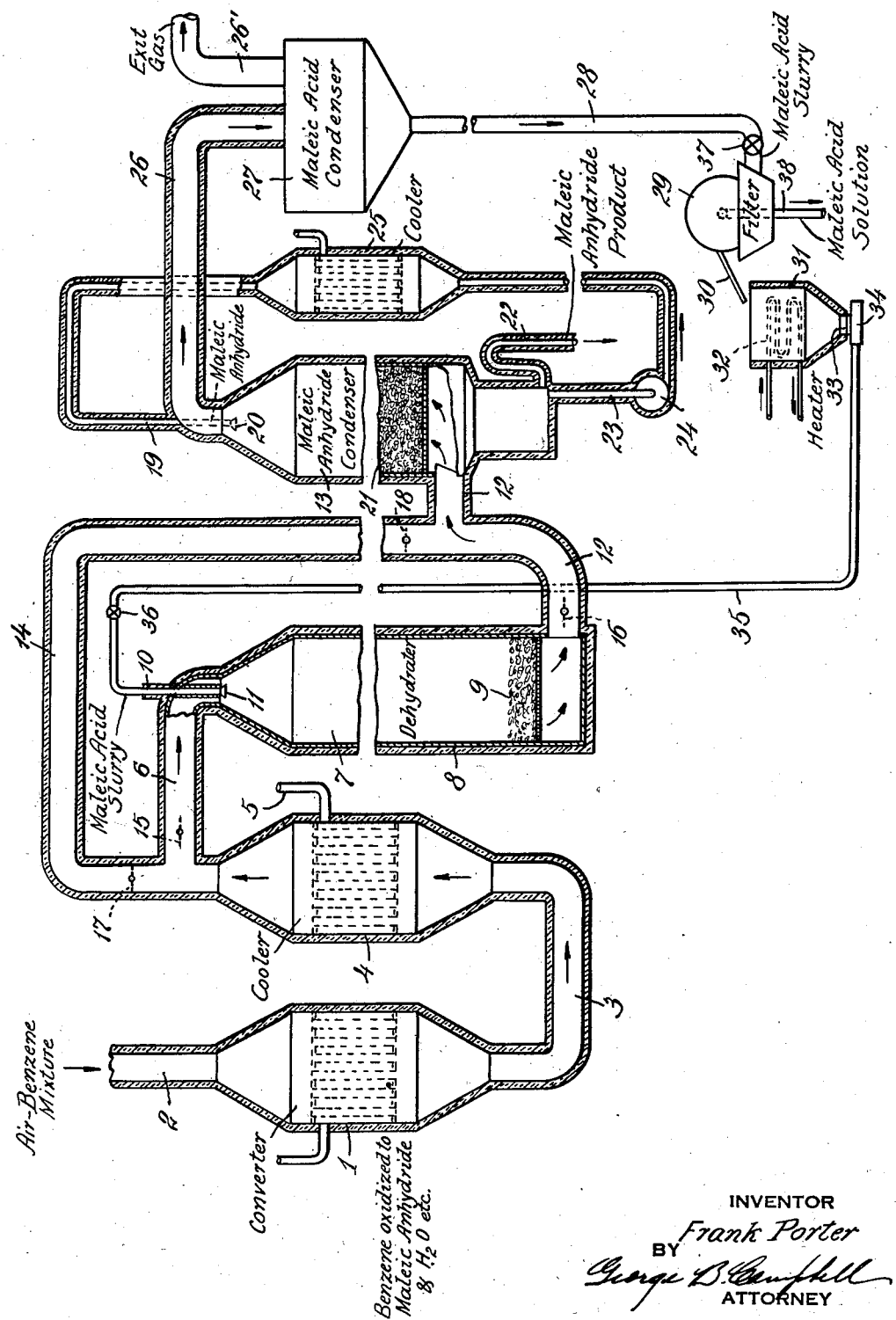
INVENTOR
Frank Porter
BY
George B. Campbell
ATTORNEY Patented Nov. 24, 1942

2,302,888

UNITED STATES PATENT OFFICE 2,302,888

MANUFACTURE OF MALEIC ANHYDRIDE

Frank Porter, Syracuse, N. Y., assignor to The Solvay Process Company, New York, N. Y., a corporation of New York Application August 6, 1940, Serial No. 351,607

13 Claims. (Cl. 260—343)

This invention relates to the manufacture of maleic anhydride. It is particularly concerned with a process for the recovery of maleic anhydride from gaseous reaction mixtures obtained by catalytic vapor phase oxidation of organic compounds such as benzene, naphthalene, gasoline, cracked kerosene, etc.

In the manufacture of maleic anhydride from benzene, a mixture of air and benzene vapor containing on the order of ½ to 1½ mols per cent of benzene vapor is passed through a so-called maleic anhydride converter containing a suitable catalyst mass (such as a vanadium oxide molybdenum oxide composition disposed on an inert carrier) maintained by adequate cooling means at an oxidation temperature between 400° and 600° C. The hot reaction mixture from the converter may contain between ¼ and 1 mol per cent more or less of maleic anhydride depending upon the efficiency of the oxidation process. In addition to maleic anhydride the reaction mixture will contain a substantial proportion of water vapor. The amount of water vapor introduced by the reaction is between 2 and 3 mols per mol of benzene oxidized and normally is in the neighborhood of 2½ mols per mol of benzene employed. The proportion of water vapor introduced with entering air may vary substantially. Thus the normal proportion of water present during the cold winter months may amount to only about 10% of the total water in the reaction mixture or even less. In the hot humid days of summer on the other hand the proportion of water introduced with the air may constitute a major part of the total water present.

In order to recover maleic anhydride from reaction gas mixtures of the type described above several methods have been proposed. The simplest method of removing the anhydride from the reaction gases involves scrubbing the gases with water to convert maleic anhydride to maleic acid. Maleic acid may be removed from the resulting solution by crystallization or evaporation. The procedure has the disadvantage that all of the maleic anhydride is converted to maleic acid and a maximum of maleic acid must be handled. This is particularly objectionable in view of the fact that aqueous solutions of maleic acid are highly corrosive to ordinary metal equipment and, if subjected to treatments for conversion to maleic anhydride or even if heated for a long period during concentration of the maleic acid, tend to form the inversion product, fumaric acid.

It has been proposed to condense a part of the maleic anhydride, or to absorb a part of the maleic anhydride, from the hot gaseous reaction mixture while maintaining water in vapor phase. Such procedures have the advantage that they reduce the proportion of maleic anhydride which must be recovered as maleic acid. Nevertheless, in view of the considerable quantities of water vapor in the reaction mixture, effective and complete recovery of maleic anhydride involves condensation of at least a part of the total maleic anhydride content of the mixture in the presence of water condensate and accordingly some aqueous maleic acid solution or slurry is produced and must be disposed of. Disposal as waste involves a substantial economic loss and may result in injury to aquatic life.

It has been proposed to utilize the maleic acid by converting it to maleic anhydride. Several methods for accomplishing this conversion have been proposed. All of these require a substantial consumption of heat for evaporation and the construction of special, acid-resistant equipment for handling the maleic acid solutions. Even when the maleic acid is separated from excess water by crystallization and settling or filtration, the subsequent conversion of maleic acid to maleic anhydride presents serious corrosion problems and, if conventional procedures are employed, may result in serious losses of maleic acid by decomposition and polymerization and by inversion to fumaric acid.

In accordance with the present invention, maleic acid is converted to maleic anhydride vapor and water vapor by bringing it into direct and intimate contact with the hot gaseous products of a maleic anhydride converter. Maleic anhydride is then recovered from the resulting gas-vapor mixture while retaining water in vapor phase.

By means of the present invention maleic acid recovered by condensation or aqueous scrubbing of reaction gases from which a portion of the maleic anhydride has been removed by condensation or by absorption in a non-aqueous liquid may be effectively disposed of by introducing this maleic acid into direct and intimate contact with the hot reaction gases from the maleic anhydride converter. For effectively dehydrating the maleic acid the gases during this step should not be cooled below a temperature 80 centigrade degrees above the dew point of water therein and preferably between 120 degrees and 150 degrees above the dew point of water. (The dew point of water is that temperature at which water would start to condense from the gases if the gases were free from maleic anhydride.) By this method of operation the heat of the reaction gases is utilized for the dehydration of the maleic acid and conversion thereof to maleic anhydride vapor and water vapor. Any water present with the maleic acid is simultaneously vaporized into the reaction gases. No additional source of heat is necessary for dehydrating the maleic acid and, since the dehydration is effected by contact with the hot reaction gases, corrosion difficulties are reduced to a minimum.

Although it might be supposed that the introduction of water vapor into the reaction gases prior to removal of maleic anhydride from the gases might adversely affect the recovery of maleic anhydride, it has been found that the entire maleic acid production of a converter unit operated under normal conditions may be injected into the gases as an aqueous slurry at a point in the gas stream ahead of the maleic anhydride recovery unit. Thus, if desired, the ultimate product from a system operated in accordance with the invention may be limited to maleic anhydride and no maleic acid need be processed outside of the recovery system.

For maximum efficiency it is desirable to maintain the ratio of maleic anhydride to water vapor in the maleic anhydride recovery unit at a maximum. Thus it is desirable that the converter unit operate at a high efficiency in order that the ratio of maleic anhydride to water formed in the reaction will be as high as possible. In order that the proportion of water vapor introduced into the system with entering air may be at a minimum, the air may be treated prior to its introduction to the converter to eliminate a portion of its contained water vapor content. Whether such a treatment is desirable in any given case will depend to a considerable extent upon the temperature and relative humidity of the available air supply.

The direct contact of maleic acid and hot reaction gases may be accomplished by spraying an aqueous maleic acid solution or slurry, or a slurry or solution of maleic acid in a non-aqueous liquid, which may be volatile or non-volatile under the conditions of dehydration, e. g. maleic anhydride, into the hot gases, or by distributing the solid maleic acid in the form of a dust in such gases.

The type of contact equipment to be employed will necessarily depend upon the method selected for effecting this contact. The contact may be effected by directing the maleic acid into the gas stream in a direction co-current, cross-current, or counter-current to the gas flow or a combination of any two or all three types of contact may be employed. The primary consideration is to obtain contact of the hot reaction gas with the maleic acid distributed in finely divided form so as to effect rapid dehydration thereof.

If substantial contact of the maleic acid and walls of the contact chamber takes place, it is desirable that these walls be constructed of some corrosion-resistant material. Since heat for the dehydration is supplied by the hot reaction gases, it is not necessary that the walls of the dehydrater be constructed of heat conductive material; in fact heat insulation is to be desired. These considerations make feasible the use of a dehydrating chamber constructed of or lined with materials of low heat conductivity, such as fire-clay, silica, or siliceous compositions, which are relatively inexpensive compared with materials of construction required for customary dehydration equipment.

The temperature of the reaction gases in the dehydration unit may be varied to a substantial extent depending upon the proportion of water or other liquid present with the maleic acid and the mol ratio of gases available to maleic acid to be dehydrated. With a highly efficient converter system employing dry air, as much as 90% of the total maleic anhydride production may be recovered in the form of maleic anhydride, leaving only 10% to be recovered as maleic acid and treated in the dehydrater. On the other hand with a less efficient unit only half of the maleic anhydride production may be recovered as maleic anhydride and the other half will be recovered as maleic acid and passed to the dehydrater. Thus, in two processes operating with the same air-benzene ratio the quantites of maleic acid introduced to the dehydrater may be five times as much in one case as in the other. Since more heat is required for the dehydration of larger quantities of maleic acid, substantially higher initial temperatures of gas entering the dehydrater are required. In general satisfactory operation of the dehydrater may be secured with gas entering the dehydrater at a temperature between 200° and 300° C.

The condensation of maleic anhydride from the resulting mixture of hot gas, maleic anhydride initially present, and maleic anhydride formed by the dehydration may be effected by cooling the gases in any suitable manner to a temperature in the neighborhood of 50° to 60° C. A simple tubular heat exchanger using a counter-currently flowing liquid or a body of boiling liquid as a cooling medium may be employed.

Since pure maleic anhydride solidifies at around 53° C. and a crude product such as produced by conventional converter operations may solidify at a temperature around 50° C., it is obvious that if the condensation is to effect recovery of maleic anhydride in liquid phase in the absence of a solvent, cooling surfaces should not be maintained at lower temperatures. For this reason it is advantageous to employ a cooler in which the cooling liquid is a boiling bath having a boiling point of 50° to 55° C. so that the maleic anhydride will not be solidified in the cooler. Such a system permits direct recovery of maleic anhydride uncontaminated by solvent liquids.

The preferred method of condensation involves the substantially continuous circulation of maleic anhydride condensate through an external cooler, for example a tubular heat exchanger supplied with a boiling liquid cooling medium, then through a condenser adapted to effect direct and intimate contact of the anhydride and the reaction gas mixture, for instance by spraying the anhydride into the gas, bubbling the gas through the liquid, or distributing the liquid in thin layers in contact with the gas, and finally again through the external cooler. By providing an adequate circulation of the anhydride, the liquid maleic anhydride condensate may be kept at a low temperature, for instance between 50° and 70°, and thus inversion of any maleic acid which it may contain is inhibited. The anhydride product may be bled off from the stream of circulating liquid at any convenient point.

A solvent liquid may be used to advantage in a system containing a high ratio of maleic anhydride to water vapor but a fairly low proportion of both. In such a system the temperature at which a substantial proportion of water is removed from the gas along with maleic anhydride may be considerably below the melting point of the maleic anhydride. A solvent liquid provides fluidity so that the temperature can be lowered and a greater proportion of the maleic anhydride recovered as such.

Recovery at elevated pressure is of advantage with systems operating with high maleic anhydride to water ratios. The pressure may be maintained sufficiently high to raise the dew point of water in the gases (considered independently of the maleic anhydride) to around 50° C.

so that a maximum of anhydride may be recovered in liquid phase without using a solvent.

Where the water vapor concentration is low enough so that water does not yet come out of the gases in substantial quantities at temperatures near or below the melting point of maleic anhydride, it is also feasible to condense the maleic anhydride in solid phase. For solid phase condensation an inert cooling liquid may be employed in direct contact with the gases, the cooling liquid being of such a nature that at the temperatures of operation the solubility of maleic anhydride therein is low. Petroleum products, such as commercial automobile motor oils may be cited as examples.

To condense maleic anhydride in solid phase by heat exchange through solid surfaces, special equipment such as the cyclic condenser system of United States Patent 2,076,033 may be employed for handling the condensate.

The removal of residual maleic anhydride from the gases may be effected by bringing the gases into direct contact with water in any conventional contact apparatus.

A system suitable for carrying out the process of the present invention is illustrated in the accompanying drawing. In the drawing the numeral 1 designates catalytic apparatus for oxidizing an organic compound to maleic anhydride, which may consist of a tubular heat exchanger the tubes of which are packed with a catalyst such as the $P_2O_5$-modified molybdenum oxide vanadium oxide catalyst described in Porter application Serial No. 211,805 filed June 4, 1938. With a catalyst of this type high efficiencies at high degrees of attack of benzene are obtainable and conversions of 60% to 70% of the benzene to maleic anhydride may be effected. The catalytic apparatus or converter is provided with an inlet 2 for introducing the mixture of oxygen-containing gas and organic compound to be oxidized. A conduit 3 leads from the converter to a heat exchanger 4. Heat exchanger 4 is advantageously a tubular heat exchanger having a boiling liquid as the cooling medium. Thus exchanger 4 is shown provided with a vapor outlet and liquid return 5. To provide variable control, means (not shown) may be arranged to control pressure on the boiling liquid and hence the temperature of the gases leaving this heat exchanger.

A conduit 6 leads from heat exchanger 4 to a dehydrater 7. The dehydrater is shown as a tower-like unit provided with a lining 8 of inexpensive corrosion-resistant material, such as brick, and with a few courses of packing 9, such as Raschig rings. Leading into the top of the dehydrater is a maleic acid inlet 10 provided with a spray nozzle 11. As will be observed, the location of the nozzle in the apparatus shown provides co-current flow of gas and maleic acid to be dehydrated. It is equally possible to locate the nozzle, directed upwardly, at a point just above packing 9 so as to secure both counter- and co-current flow of maleic acid as it is sprayed upward and falls back in the chamber. The dehydrater 7 may be provided with ports (not shown) to permit convenient cleaning of the packing and spray nozzle. Leading from dehydrator 7 is a conduit 12 which connects with the bottom of a condensing tower 13. The system as shown is also provided with a by-pass conduit 14 leading from conduit 6 to conduit 12 and by-passing the dehydrating unit. Dampers 15, 16, 17, and 18 are provided for determining the flow of gas either through the dehydrater or alternatively through the by-pass 14 to the condensing tower 13. Tower 13 is of construction somewhat similar to dehydrater 7. It too may be lined with acid-resistant material but since the temperatures prevailing in it are considerably lower than the temperatures prevailing in the dehydrater 7 and since the concentration of maleic acid is low, tower 13 is subjected to less corrosive conditions than dehydrater 7. However, materials promoting hydration of maleic anhydride should be avoided.

Condensing tower 13 is provided at the top with a liquid inlet pipe 19 having nozzle 20. Its intermediate section is partly filled with packing material such as Raschig rings 21. At the bottom is an outlet 22 arranged to form a liquid seal and to maintain a constant level of liquid in the bottom of the tower 13. A second outlet 23 connects the bottom of the tower 13 with a pump 24 and thence with a heat exchanger 25 which may be similar to heat exchanger 4. The top of heat exchanger 25 is joined by inlet pipe 19 to nozzle 20.

From the top of tower 13 a gas conduit 26 leads to a scrubbing apparatus 27 in which the gas may be contacted with water to remove residual maleic acid. Bubbler, spray, or packed section apparatus is suitable for effecting this contact. A conduit 26' is provided to exhaust the gases from the system.

From scrubber 27 a line 28 leads to a drum filter 29 for separating solid maleic acid from water condensate and, if used, scrubbing liquid. Liquid may be returned via outlet 30 to the scrubber. A doctor 30 of the drum filter removes the maleic acid crystals from the drum and drops them into a small container 31 which is provided with a heating coil 32. This container has an outlet 33 leading to pump 34 which is connected by a conduit 35 to the aforementioned maleic acid inlet 10. Inlet 10 is provided with a valve 36; line 28, with a valve 37.

Those portions of the apparatus contacted with maleic acid and particularly with hot maleic acid should be constructed of corrosion-resistant material. A suitable metal for this purpose is a steel containing on the order of 18% chromium, 8% nickel, and 3% molybdenum.

It is desirable for convenient control that the system be at least lightly lagged to prevent variable losses of heat depending upon atmospheric conditions and to avoid condensation or freezing in the apparatus, especially where temperatures are maintained only slightly above the dew point or solidifying point of the mixtures contained.

The following example illustrates the operation of the apparatus described above.

An air-benzene mixture containing on the order of 1 mol per cent of water vapor and 1 mol per cent of benzene vapor is introduced through inlet 2 to converter 1 maintained at a temperature between about 450° and 550° C. The gases resulting from the reaction in the converter may contain about 0.65 mol per cent of maleic anhydride, about 3½ mol per cent of water vapor, and small proportions of unreacted benzene and by-products.

The reaction mixture passes through conduit 3 to heat exchanger 4 where, by indirect heat exchange with boiling liquid such as water under pressure, it is subjected to controlled cooling to a temperature of about 220° C. (Cooling may be controlled by regulation of pressure on the cooling fluid in cooler 4 so as to provide a satisfactory constant temperature exit the cooler or inlet or exit the dehydrater by locating a thermostatic regulator at one of these points. Each location has some advantages and some disadvantages.) The reaction gases at this temperature pass into dehydrater 7 where a spray of maleic acid slurry is injected into them and the maleic anhydride content is thus raised to about 1 mol per cent, the water content is raised to about 5 mol per cent, and the temperature is lowered to about 180° C. The resulting mixture then passes into tower 13 where it meets a voluminous countercurrent flow of maleic anhydride liquid and is cooled down to a temperature between 55° and 60°. This cooling condenses out a major part of the maleic anhydride which mingles with the maleic anhydride cooling liquid and collects at the bottom of the tower. The temperature of the liquid collected at the bottom of this tower may be in the neighborhood of 60° C. The major portion of this liquid is recirculated by pump 24 to heat exchanger 25 where it is cooled to a temperature of about 50° to 55° C. and then again introduced into the tower 13. As the maleic anhydride, which may contain on the order of 1% of water present as maleic acid, falls to the bottom of tower 13 it is permitted to overflow through pipe 22 to suitable storage or further treatment equipment, such as the maleic anhydride purification still. Residual gases pass from tower 13 thru conduit 26 into scrubber 27 where the balance of the maleic anhydride which they contain is removed by contact of the gases with water. There is thus formed a maleic acid slurry. The scrubbing vessel may be provided with cooling coils (not shown) to maintain the proper temperature. Reaction gases thus freed of maleic anhydride are exhausted through outlet 26'.

Maleic acid slurry flows from scrubber 27 through conduit 28 to drum filter 29 where the major portion of the water is removed. The water, containing dissolved maleic acid and impurities, may be returned to the scrubber. A portion may (but need not) be discarded to prevent building up of impurities to an undesirable degree. From the filter a filter cake composed of about 0.35 mol of crude maleic acid and 1.1 mol of water (per mol of benzene introduced to the system) is recovered and collected in container 31. In this container it is heated to about 80° C. to render it fluid and is then forced by pump 34 into dehydrater 7. The nozzle 11 should be adjusted so as to provide as fine a state of division as possible without clogging.

The process may be operated as described above for long periods without interruption. However, since the maleic acid is not wholly pure and there is normally some tar formation in the dehydrater, foreign material will gradually build up on the surfaces of this unit. In order that it may be cleaned, valve 37 may be closed and pump 34 stopped, thereby permitting maleic acid to accumulate in container 31; and dampers 15 and 16 may be turned to closed position and dampers 17 and 18 to open position so that reaction gases bypass the dehydrater.

I claim:

1. The method of converting maleic acid to maleic anhydride, which comprises bringing the maleic acid into direct contact with the hot gaseous products from a maleic anhydride converter while maintaining the hot gaseous products at a temperature at least 80 centigrade degrees above the dew point of water therein.

2. The method of converting maleic acid to maleic anhydride, which comprises spraying maleic acid into the hot gaseous products from a maleic anhydride converter while maintaining the hot gaseous products at a temperature at least 80 centigrade degrees above the dew point of water therein.

3. The method of making maleic anhydride from maleic acid, which comprises spraying maleic acid into the hot gaseous products from a maleic anhydride converter to convert the maleic acid to maleic anhydride vapor and water vapor, and recovering maleic anhydride from the resulting gas-vapor mixture while retaining water in vapor phase.

4. The method of making maleic anhydride from maleic acid, which comprises spraying maleic acid into the hot gaseous products from a maleic anhydride converter to convert the maleic acid to maleic anhydride vapor and water vapor, and fractionally cooling the resulting gas-vapor mixture to condense maleic anhydride while retaining water in vapor phase.

5. The method of making maleic anhydride from maleic acid, which comprises spraying maleic acid into the hot gaseous products from a maleic anhydride converter while said products are at a temperature at least 80 centigrade degrees above the dew point of water therein to convert the maleic acid to maleic anhydride vapor and water vapor, and fractionally cooling the resulting gas-vapor mixture to condense maleic anhydride while retaining water in vapor phase by contacting the mixture with liquid maleic anhydride maintained at a temperature between 50° C. and 70° C.

6. In the manufacture of maleic anhydride by a vapor phase oxidation process wherein a hot reaction mixture of gas, maleic anhydride vapor, and water vapor is formed at a temperature substantially above the dew point of water therein, the improvement which comprises fractionally separating maleic anhydride from the hot reaction mixture while retaining water in vapor phase, cooling the resulting gas-vapor mixture to condense maleic acid, and bringing maleic acid thus condensed into contact with the hot reaction mixture while said mixture is at a temperature substantially above the dew point of water so as to vaporize said maleic acid.

7. In the manufacture of maleic anhydride by a vapor phase oxidation process wherein a hot reaction mixture of gas, maleic anhydride vapor, and water vapor is formed at a temperature substantially above the dew point of water therein, the improvement which comprises fractionally separating maleic anhydride from the hot reaction mixture while retaining water in vapor phase, cooling the resulting gas-vapor mixture to condense maleic acid and water, separating at least a part of the water from the maleic acid, and bringing the maleic acid into contact with the hot reaction mixture while said mixture is at a temperature at least 80 centigrade degrees above the dew point of water so as to vaporize said maleic acid.

8. In the manufacture of maleic anhydride by a vapor phase oxidation process wherein a stream of a hot reaction mixture of gas, maleic anhydride vapor, and water vapor is formed at a temperature substantially above the dew point of water therein, the improvement which comprises introducing maleic acid into direct contact with the hot gas-vapor stream while the temperature of said stream is at least 80 centigrade degrees above the dew point of water vapor so as to convert the maleic acid to maleic anhydride vapor and water vapor, fractionally cooling the resulting gas-vapor stream to condense maleic anhydride while retaining water in vapor phase, withdrawing the maleic anhydride condensate from the gas-vapor stream, further cooling the residual gas-vapor stream so as to condense maleic acid therefrom, and returning such maleic acid into direct contact with the hot stream while at a temperature at least 80 centigrade degrees above the dew point of water vapor as aforesaid.

9. In the manufacture of maleic anhydride by vapor phase air oxidation of benzene wherein a stream of hot reaction mixture comprising gaseous components, maleic anhydride vapor, and water vapor is formed at a temperature substantially above the dew points of maleic anhydride and water therein, the improvement which comprises (a) bringing the hot stream at a temperature above the dew points of maleic anhydride and water into direct contact with an amount of maleic acid from (c), insufficient to cool the stream below the dew point of maleic anhydride, so as to vaporize the maleic acid, (b) thereafter cooling the stream to a temperature below the dew point of maleic anhydride but above the dew point of water so as to condense maleic anhydride, and (c) further cooling the stream to a temperature below the dew point of water so as to condense water and residual maleic anhydride in the form of maleic acid.

10. In the manufacture of maleic anhydride by vapor phase air oxidation of benzene wherein a stream of hot reaction mixture comprising gaseous components, maleic anhydride vapor, and water vapor is formed at a temperature substantially above the dew points of maleic anhydride and water therein, said stream containing water vapor in such proportion that the dew point thereof is substantially below the dew point of maleic anhydride, the improvement which comprises (a) bringing the hot stream at a temperature above the dew points of maleic anhydride and water into direct contact with an amount of maleic acid from (d), insufficient to cool the stream below the dew point of maleic anhydride, so as to vaporize the maleic acid, (b) thereafter cooling the stream to a temperature below the dew point of maleic anhydride but above the dew point of water so as to condense maleic anhydride, (c) further cooling the stream to a temperature below the dew point of water so as to condense water and residual maleic anhydride in the form of maleic acid, and (d) mechanically separating water from maleic acid condensed in (c).

11. In the manufacture of maleic anhydride by vapor phase air oxidation of benzene wherein a stream of hot reaction mixture comprising gaseous components, maleic anhydride vapor, and water vapor is formed at a temperature between 400° C. and 600° C., the improvement which comprises (a) cooling the stream to a temperature between 200° C. and 300° C., (b) spraying maleic acid directly into the gas stream so as to cool the stream and vaporize the maleic acid and limiting such spraying so as to cool the stream to a temperature between 120 and 150 centigrade degrees above the dew point of water but not below the dew point of maleic anhydride therein, (c) thereafter subjecting the stream to regulated further cooling to a temperature substantially below the dew point of maleic anhydride and above the dew point of water to form a condensate essentially composed of maleic anhydride, (d) further cooling the residual stream below the dew point of water to form a condensate essentially composed of water and maleic acid, (e) mechanically separating water from the condensate of step (d), and (f) returning the resulting dewatered condensate to step (b).

12. The method of making maleic anhydride, which comprises passing a mixture of air and benzene vapor containing between ½ and 1½ mol per cent of benzene vapor through a catalytic converter wherein the reaction conditions are controlled to effect conversion of at least 60% of the benzene in the mixture to maleic anhydride, and to form a stream of hot reaction mixture comprising gaseous components, maleic anhydride vapor, and water vapor at a temperature substantially above the dew point of water therein, fractionally separating maleic anhydride from the hot reaction mixture while retaining water in vapor phase, cooling the resulting gas-vapor mixture to condense maleic acid, bringing maleic acid thus condensed into contact with the hot reaction mixture while said mixture is at a temperature substantially above the dew point of water so as to vaporize said maleic acid, and limiting the proportion of water returned with said maleic acid to the reaction mixture so as to maintain the dew point of water in the resulting mixture below the maleic anhydride separating temperature.

13. The method of making maleic anhydride, which comprises passing a mixture of air and benzene vapor containing between ½ and 1½ mol per cent of benzene vapor through a catalytic converter wherein the reaction conditions are controlled to effect conversion of at least 60% of the benzene in the mixture to maleic anhydride, and to form a stream of hot reaction mixture comprising gaseous components, maleic anhydride vapor, and water vapor at a temperature between 400° C. and 600° C., cooling the stream to a temperature between 200° C. and 300° C., spraying maleic acid directly into the cooled stream so as to further cool the stream and vaporize the maleic acid and limiting such spraying so that the stream is cooled to a temperature between 120 and 150 centigrade degrees above the dew point of water but not below the dew point of maleic anhydride therein, thereafter subjecting the stream to regulated further cooling to a temperature substantially below the dew point of maleic anhydride and above the dew point of water to form a condensate essentially composed of maleic anhydride, and further cooling the residual stream below the dew point of water to form a condensate essentially composed of maleic acid and water, mechanically separating water from said last named condensate and using the resulting dewatered condensate in the aforementioned maleic acid vaporization step, and limiting the proportion of water returned with said maleic acid to the reaction mixture so as to maintain the dew point of water in the resulting mixture below the maleic anhydride separating temperature.

FRANK PORTER.

CERTIFICATE OF CORRECTION.

Patent No. 2,302,888.  November 24, 1942.

FRANK PORTER.

It is hereby certified that error appears in the printed specification of the above numbered patent requiring correction as follows: Page 2, second column, line 6, for "quantites" read --quantities--; page 5, first column, line 62, claim 11, after "600° C.," insert the words and comma --said stream containing water vapor in such proportion that the dew point thereof is substantially below the dew point of maleic anhydride,--; and that the said Letters Patent should be read with this correction therein that the same may conform to the record of the case in the Patent Office.

Signed and sealed this 2nd day of February, A. D. 1943.

(Seal)

Henry Van Arsdale,
Acting Commissioner of Patents.